(12) United States Patent
Tevis et al.

(10) Patent No.: US 9,575,978 B2
(45) Date of Patent: Feb. 21, 2017

(54) RESTORING OBJECTS IN A CLIENT-SERVER ENVIRONMENT

(75) Inventors: Gregory J. Tevis, Tucson, AZ (US); Oren Wolf, Waltham, MA (US)

(73) Assignee: International Business Machines Corporation, Armonk, NY (US)

( * ) Notice: Subject to any disclaimer, the term of this patent is extended or adjusted under 35 U.S.C. 154(b) by 1009 days.

(21) Appl. No.: 13/533,884

(22) Filed: Jun. 26, 2012

(65) Prior Publication Data

US 2013/0346374 A1    Dec. 26, 2013

(51) Int. Cl.
*G06F 12/00* (2006.01)
*G06F 17/30* (2006.01)

(52) U.S. Cl.
CPC .. *G06F 17/30091* (2013.01); *G06F 17/30312* (2013.01)

(58) Field of Classification Search
None
See application file for complete search history.

(56) References Cited

U.S. PATENT DOCUMENTS

| | | | |
|---|---|---|---|
| 5,864,837 A * | 1/1999 | Maimone | G06F 17/30067 |
| 6,865,655 B1 | 3/2005 | Andersen | |
| 7,539,710 B1 | 5/2009 | Haustein et al. | |
| 7,814,149 B1 | 10/2010 | Stringham | |
| 2007/0100913 A1 | 5/2007 | Sumner et al. | |
| 2008/0005201 A1 | 1/2008 | Ting et al. | |
| 2008/0040505 A1 * | 2/2008 | Britto et al. | 709/238 |
| 2008/0270436 A1 | 10/2008 | Fineberg et al. | |
| 2009/0177855 A1 | 7/2009 | Drews et al. | |
| 2009/0182789 A1 | 7/2009 | Sandorfi et al. | |
| 2009/0204636 A1 | 8/2009 | Li et al. | |
| 2009/0210640 A1 | 8/2009 | Davis | |
| 2009/0265399 A1 | 10/2009 | Cannon et al. | |
| 2009/0271454 A1 | 10/2009 | Anglin et al. | |
| 2009/0300321 A1 | 12/2009 | Balachandran et al. | |
| 2009/0313312 A1 | 12/2009 | Colbeck et al. | |

(Continued)

FOREIGN PATENT DOCUMENTS

WO    2011110533    9/2011

OTHER PUBLICATIONS

D. Geer., "Reducing the Storage Burden via Data Deduplication", IEEE JNL Computer, vol. 14, Iss. 12, Dec. 2008, pp. 15-17.

(Continued)

*Primary Examiner* — Jau-Shya Meng
(74) *Attorney, Agent, or Firm* — David W. Victor

(57) ABSTRACT

Provided are a computer program product, system, and method for restoring objects in a client-server environment. An entry is added to an index for each chunk identifier. Each index entry includes one of the chunk identifiers and a reference to the chunk of data in the target storage from which the chunk identifier was calculated. A request is transmitted to a server recovery agent to recover an object from the storage server. Chunk identifiers of chunks of data in the requested object to recover are received from the server recovery agent. A determination is made from the index of whether the received chunk identifiers for the requested object matches the chunk identifiers indicated in the index. A request is made of the chunks from the server recovery agent for the received chunk identifiers not matching chunk identifiers in the index entries.

20 Claims, 6 Drawing Sheets

(56) References Cited

U.S. PATENT DOCUMENTS

| | | |
|---|---|---|
| 2009/0319585 A1 | 12/2009 | Gokhale et al. |
| 2010/0098092 A1 | 4/2010 | Luo et al. |
| 2011/0218969 A1 | 9/2011 | Anglin et al. |
| 2011/0252071 A1 | 10/2011 | Cidon |
| 2012/0109912 A1* | 5/2012 | Donze et al. ............. 707/694 |

OTHER PUBLICATIONS

Liu et al., "Semantic Data De-Duplication for Archival Storage Systems", IEEE CNF ACSAC, 13th Asia-2011110533acific, Aug. 4-6, 2008, pp. 1-9.

Yang et al., "FBBM: A New Backup Method with Data De-Duplication Capability", IEEE CNF, Inter. Conference on Apr. 24-26, 2008, pp. 30-35.

Won et al., "Efficient Index Lookup for De-Duplication Backup Systems", IEEE International Symposium on Sep. 8-10, 2008, pp. 1-3.

Search Report and Written Opinion dated May 11, 2011, for International Application No. PCT/EP2011/053408, filed Mar. 8, 2011, pp. 1-10.

USPTO Patent Application with U.S. Appl. No. 12/719,108, entitled, "Approach for Optimizing Restores of Deduplicated Data", filed Mar. 8, 2010, pp. 1-22, invented by Matthew J. Anglin et al.

Office Action dated Nov. 9, 2011, pp. 1-20, for U.S. Appl. No. 12/719,108, filed Mar. 8, 2010, by inventors Matthew J. Anglin et al.

Response to Office Action dated Feb. 8, 2012, pp. 11-15, for U.S. Appl. No. 12/719,108, filed Mar. 8, 2010, by inventors Matthew J. Anglin et al.

Final Office Action dated Feb. 24, 2012, pp. 1-20, for U.S. Appl. No. 12/719,108, filed Mar. 8, 2010, by inventors Matthew J. Anglin et al.

Response to Final Office Action dated Apr. 24, 2012, pp. 1-17, for U.S. Appl. No. 12/719,108, filed Mar. 8, 2010, by inventors Matthew J. Anglin et al.

Applicant Interview Summary with Examiner, dated Feb. 8, 2012, 1 pp., for U.S. Appl. No. 12/719,108, filed Mar. 8, 2010, by inventors Matthew J. Anglin et al.

Applicant Interview Summary with Examiner, dated Mar. 20, 2012, pp. 1-3, for U.S. Appl. No. 12/719,108, filed Mar. 8, 2010, by inventors Matthew J. Anglin et al.

Applicant Interview Summary with Examiner, dated Apr. 24, 2012, 1 pp., for U.S. Appl. No. 12/719,108, filed Mar. 8, 2010, by inventors Matthew J. Anglin et al.

IBM, "Backup/Restore System That Supports Bi-Directionally Optimized Deduplication", IP.com Prior Art Database Disclosure No. IPCOM000185424D, dated Jul. 24, 2009, pp. 1-4.

* cited by examiner

Object Information

Chunk Index Entry (Client or Server)

RESTORING OBJECTS IN A CLIENT-SERVER ENVIRONMENT

FIELD OF THE INVENTION

The present invention relates to a computer program product, system, and method for restoring objects in a client-server environment.

DESCRIPTION OF THE RELATED ART

Backup recovery solutions provide recovery time objectives (RTO) and recovery point objectives (RPO) that vary between a couple of seconds to a couple of hours to recover data objects. When a user initiates a restore procedure, the data is transferred from the backup media to a designated target for recovery. This restore procedure can take substantial time when the user is restoring large objects having large amounts of data. The restore time itself is dependent on multiple variables including the backup media being used, the network over which the data is transferred, e.g., Storage Area Network (SAN), Local Area Network (LAN), etc, read speeds from the backup media, write speeds to the target, the backup technology that was used (full+incremental, full+differential, full alone), and additional factors.

Multiple data reduction technologies are being used by data protection products to either reduce the amount of data that is sent to the backup repository or reduce the size of the backup repository itself. Such technologies are well established in the market and vary between reducing the actual size of the protected data (through various incremental backup technologies that handle only changed data) and reducing the amount of data sent to the backup repository by utilizing various mathematical algorithms to identify "repeating patterns" and send them only once (compression, deduplication etc.)

There is a need in the art for improved techniques for data recovery in a client-server environment.

SUMMARY

Provided are a computer program product, system, and method for restoring objects in a client-server environment. Unique chunk identifiers are generated for chunks of data in the data objects stored in the target storage. An entry is added to an index for each generated chunk identifier. Each index entry includes one of the chunk identifiers and a reference to the chunk of data in the target storage from which the chunk identifier was calculated. A request is transmitted to a server recovery agent to recover an object from the storage server. Chunk identifiers of chunks of data in the requested object to recover are received from the server recovery agent. A determination is made from the index of whether the received chunk identifiers for the requested object matches the chunk identifiers indicated in the index. A request is made of the chunks from the server recovery agent for the received chunk identifiers not matching chunk identifiers in the index entries.

Further provided, are a computer program product, system, and method for processing requests for data objects stored in a server storage from a client recovery agent. A request is received from the client recovery agent to recover an object from the storage server. A determination is made of identifiers of chunks in the requested object to recover. The determined chunk identifiers are sent to the client recovery agent to use to recover the requested object. A request is received from the client recovery agent for the chunks associated with the determined chunks chunk identifiers that do not match chunk identifiers in entries in an index the client recovery agent maintains for chunks in a target storage. The requested chunks are transmitted to the client recovery agent in response to receiving chunk identifiers of the chunks of data in the object from the client recovery agent.

DETAILED DESCRIPTION

Described embodiments provide techniques for restoring objects in a client-server environment. The client may want to recover data objects comprised of chunks of data maintained by the server in a source storage to provide to the client local target storage. The client would send a request to recover or access data objects. In response, the server sends the requesting client chunk identifiers of the chunks in the object to restore. The client processes the received chunk identifiers to determine whether the chunks of the data object to recover are stored in the client local target storage. For those chunks maintained locally, the client recovers the chunks for the data object to restore from the local target storage. If the chunks of the object to restore are not stored locally, then the client requests that the server send those chunks to the client.

Figure 1:
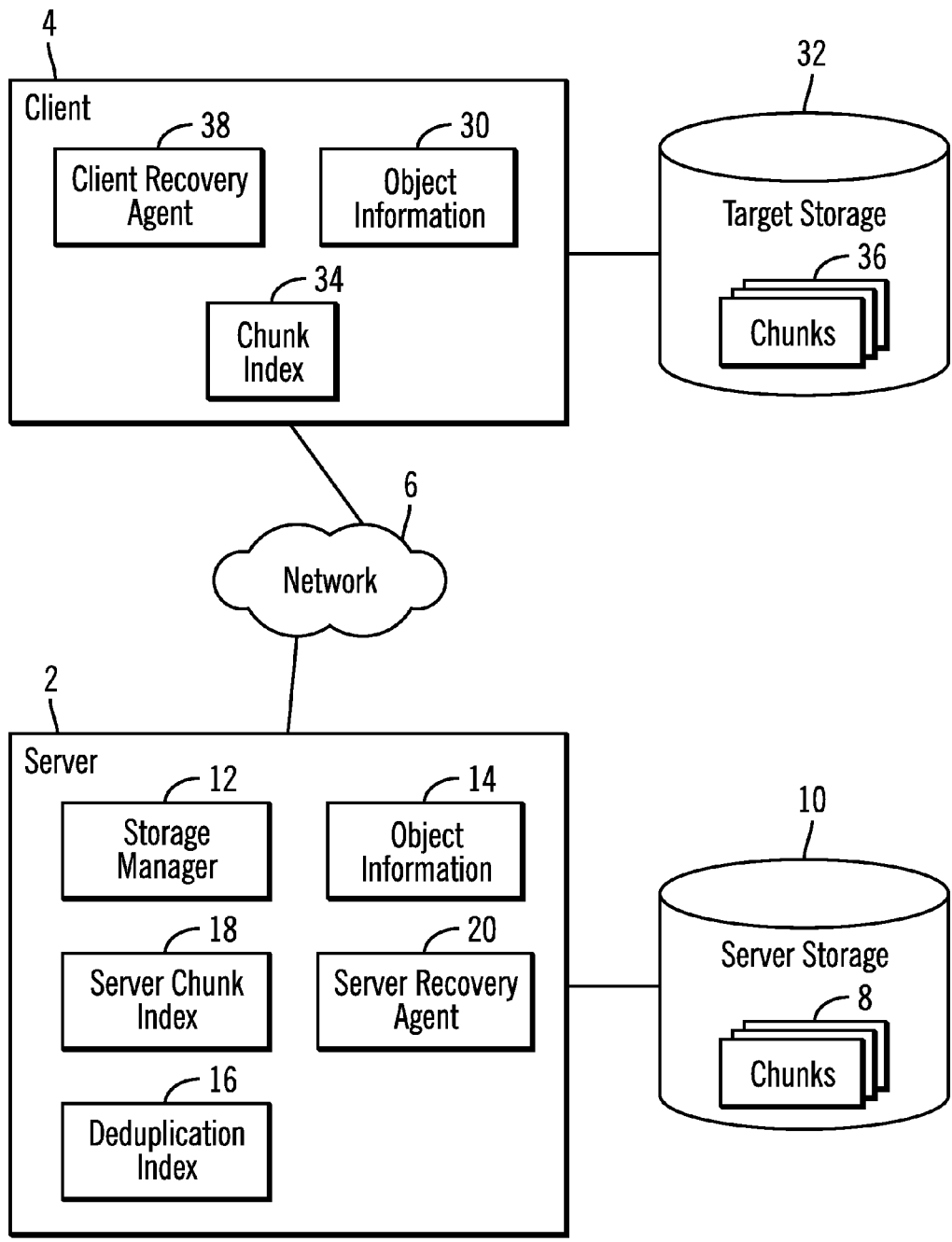
FIG. 1 illustrates a computing environment in which embodiments are implemented.

FIG. 1 illustrates an embodiment of a computing environment having a server 2 that receives and processes data objects from clients 4 over a network 6. The objects are comprised of chunks 8 of data the server 2 stores in a server storage 10. The server 2 has a storage manager 12 to manage the storage of data objects in the storage 10. The storage manager 12 maintains object information 14 having information on the objects in the storage 10. The object information 14 may provide an ordered list of chunks 8 and the addresses of those chunks 8 in the storage 10. The objects represented in the object information 14 whose chunks 8 of data are stored in the storage 10 may comprise files, database tables, multimedia content, programs, data sets, volumes, images or any other grouping of data that may be presented for storage. The storage manager 12 may provide storage for active data objects being used by the clients 4 in real time operations and/or may comprise a backup manager backing-up and archiving client 4 data objects.

The storage manager 12 may maintain a deduplication index 16 having information on the chunks 8 in the storage 10 to ensure that when storing received data objects having chunks only one copy of a chunk 8 is stored in the storage 10, i.e., no duplicate copies, although one chunk 8 may be referenced in multiple data objects. The storage manager 12 may further maintain a server chunk index 18 having information on the chunk identifier and location of the chunks 8 in the storage 10. Due to server-memory space constraints, the deduplication index 16 may not maintain an entry for each individual chunk 8 in the storage that is referenced in data objects indicated in the object information 14. However, the chunk index 18 maintains information on all the chunks 8 in the storage 10 for use in accessing the chunks 8.

In certain embodiments, the server 2 may not have a deduplication index 16 and instead maintain the chunk index 18 to provide chunk identifier information on the chunks in the storage 10. Alternatively, there may be a single deduplication/chunk index having entries on the chunks in the storage 10.

The server 2 further has a server recovery agent 20 to manage recovery operations requested by the clients 2 to restore objects at the clients 2.

The client 4 may include object information 30 having information about objects stored in a target storage 32 used by the client 4, similar to the server object information 14, and may include a chunk index 34 having information on chunks 36 in the target storage 32, including a chunk identifier and reference to the chunk in the target storage 32. The chunks 36 may comprise a local copy of the chunks 8 at the server storage 10 that the target storage 32 maintains locally for use by the clients 4. The client 4 may further include a client recovery agent 38 to manage recovery operations to restore objects from the server 2 and server recovery agent 20.

The server 2 may communicate with the clients 4 over a network 6, such as a local area network (LAN), storage area network (SAN), wide area network (WAN), cloud computing model, etc. In further embodiments, the server 2 and client 4 may be connected by a direct cable connection or may comprise components on a single computer system platform, and may communicate over a bus or via memory.

The server 10 and target 32 storages may comprise storage media implemented in one or more storage devices known in the art, such as interconnected hard disk drives (e.g., configured as a DASD, RAID, JBOD, etc.), solid state storage devices (e.g., EEPROM (Electrically Erasable Programmable Read-Only Memory), flash memory, flash disk, storage-class memory (SCM)), electronic memory, magnetic tape media, tape cartridges, etc.

The storage manager 12, server recovery agent 20, and client recovery agent 38 may comprise software programs in a memory executed by a processor of the server 2. In an alternative embodiment, some portion or all of the storage manager 12 may be implemented in a hardware component, such as a dedicated integrated circuit, e.g., Application Specific Integrated Circuit (ASIC), expansion card, etc.

In FIG. 1, the server 20 and client 38 recovery agents are shown as included in the server 2 and client 4 systems. In such embodiments, the server 20 and client 38 recovery agents are hosted on the systems 2 and 4 that manage the storage 10, 32, respectively. In further embodiments, the server 20 and client 38 recovery agents may be located on other systems in the network 6, yet manage the flow of chunks of data being recovered to minimize the amount of data the server 2 needs to transfer to the client 4 to recover the data objects. In this way, recovery operations are offloaded from the server 2 and client 4 system components and implemented in separate systems, such as special recovery systems. Further, multiple server 20 and client 38 recovery agents may be deployed to provide for parallelism in recovery throughput.

Figure 2:
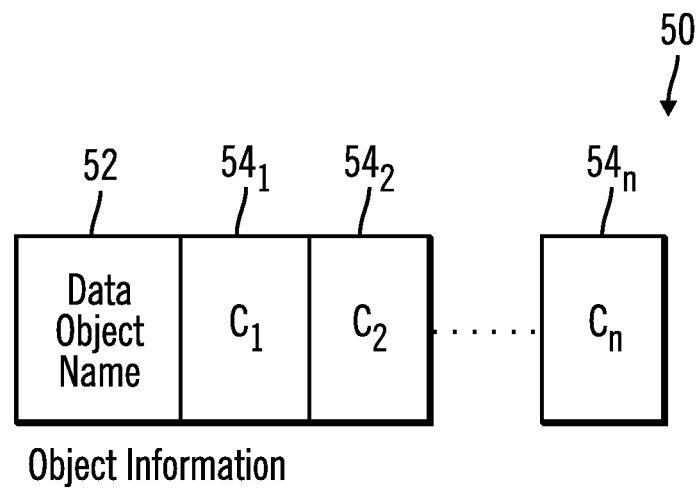
FIG. 2 illustrates an embodiment of object information.

FIG. 2 illustrates an embodiment of an instance of object information 50 for one data object maintained in the object information 14 and 30 at the server 2 and clients 4. The object information 50 for one data object includes a data object name 52 assigned to the data object by the client 4, such as a unique identifier name and one or more chunk identifiers ($C_i$) $54_1$, $54_2$ . . . $54_n$ of chunks assigned to the client data object 52. The actual chunks may be of variable length, i.e., have the same or different lengths, or of a fixed length. The object information 50 may maintain an ordered list of the chunk identifiers ($C_1$ . . . $C_n$) indicating the order 1 . . . n in which the chunks appear in the data object.

In one embodiment, the chunk identifier ($C_i$) $54_1$, $54_2$ . . . $54_n$ is calculated by processing the chunk data to generate a unique value for the chunk, such as by using the as MD5 (Message-Digest Algorithm 5) or SHA-1 (Secure Hash Algorithm 1), which calculates cryptographic hashes of chunks in a data object. In an alternative embodiment, the chunk identifier $54_1$, $54_2$ . . . $54_n$ may comprise a direct reference to a location in the storage 8, and not a hashed value of the data.

Figure 3:
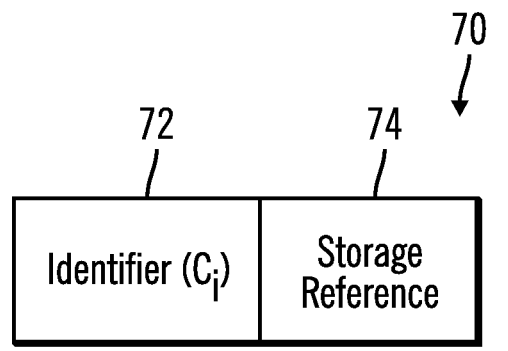
FIG. 3 illustrates an embodiment of a chunk and server index entry.

FIG. 3 illustrates an embodiment of a chunk index entry 70 in the server 18 and client 34 chunk indexes for chunks 8 and 36 in the storages 10 and 32, respectively. The index entry 70 includes a chunk identifier (Ci) 72 which may be calculated from a single chunk 8, 36, such as calculated according to the technique used to calculate the chunk identifiers $54_1$, $54_2$ . . . $54_n$. A storage reference 74 references the chunks 8, 36 in the storage 10, 32 associated with the chunk identifier 72. The chunk identifiers may comprise unique identifiers of the chunks calculated from the chunk data.

Figure 4:
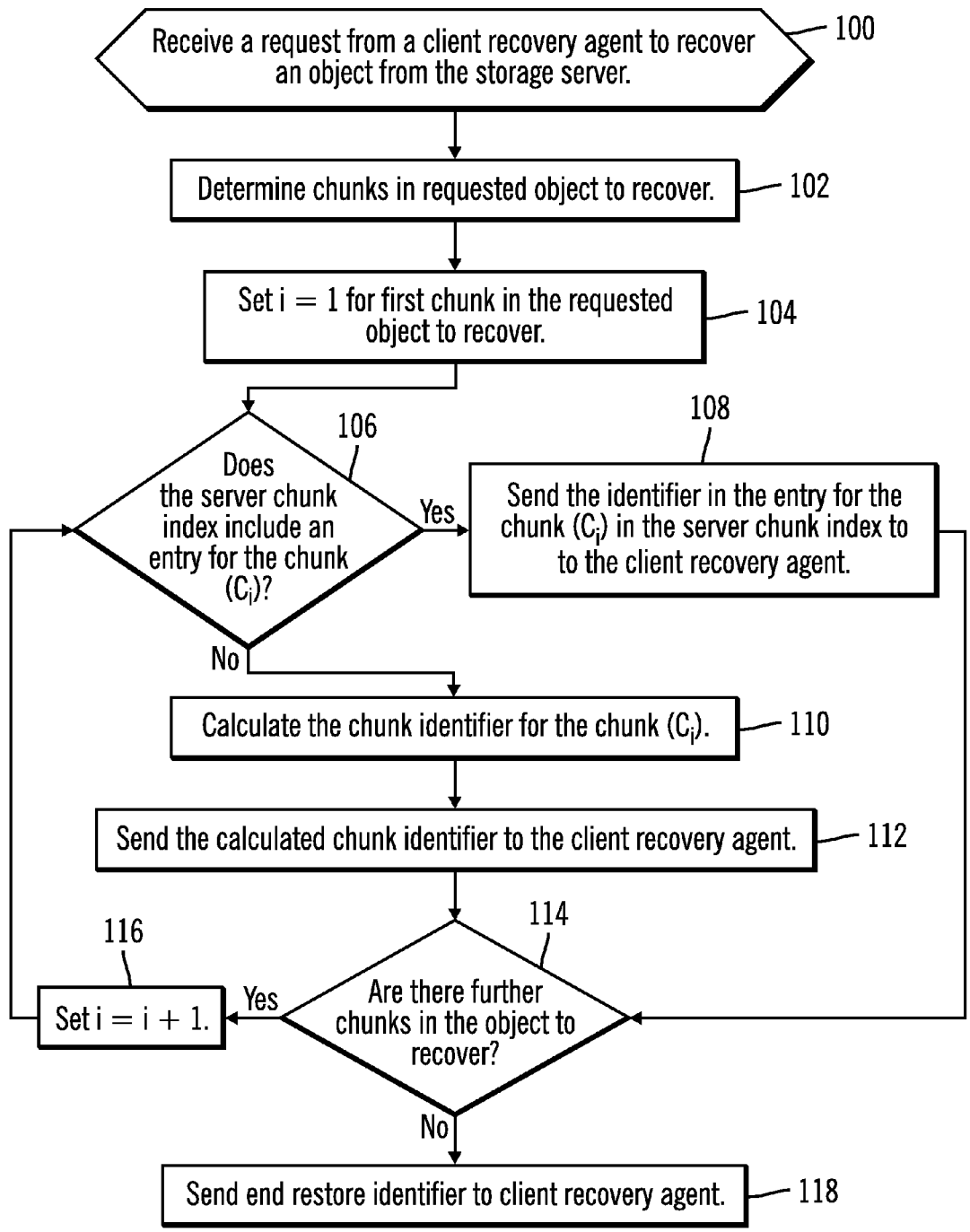
FIG. 4 illustrates an embodiment of operations for a server recovery agent to process a request to recover an object.

FIG. 4 illustrates an embodiment of operations performed by the server recovery agent 20 to process a request from the client recovery agent 38 to restore an object from the server 2. Upon receiving (at block 100) a request to recover the object, the server recovery agent 20 determines (at block 102) chunks 8 in the requested object to recover. Operations are then performed at blocks 104-116 for each chunk 8 in the object to recover. A variable i for a chunk number is set (at block 104) to the first chunk in the data object to one. If (at block 106) the server chunk index 18 includes an entry 70 for the chunk ($C_i$), then the server recovery agent 20 sends (at block 108) the chunk identifier in the entry for the chunk ($C_i$) in the server chunk index 18 to the client recovery agent 38. If (at block 106) there is no entry 70 in the server chunk index 18 for the chunk ($C_i$) in the object, then the server recovery agent 20 calculates (at block 110) the chunk identifier for the chunk ($C_i$), such as by using the hash algorithms described above, and sends (at block 112) the calculated chunk identifier to the client recovery agent 38 to recover that chunk in the object. From blocks 108 or 112, if (at block 114) there are further chunks in the object to recover, then the variable i is incremented (at block 116) and control proceeds back to block 106 to process the next chunk ($C_{i+1}$) to recover. If (at block 114) there are no further chunks to recover, then the server recovery agent 20 sends (at block 118) an end restore identifier to the client recovery agent 38 to indicate that recovery is complete.

The server recovery agent 20 may perform the enhanced recovery process regardless of whether the server storage manager 12 has a deduplication index 16 to deduplicate chunks 8 being stored. If the server storage manager 12 maintains a deduplication index 16, then the server chunk index 18 may be implemented in the deduplication index 16, which provides information on chunks 8 in the server storage 10. Alternatively, if the server storage manager 12 does not have a deduplication index 16 to perform deduplication, then the server recovery agent 20 maintains the server chunk index 18 to manage the restore operations requested by the client recovery agent 38.

Figure 5:
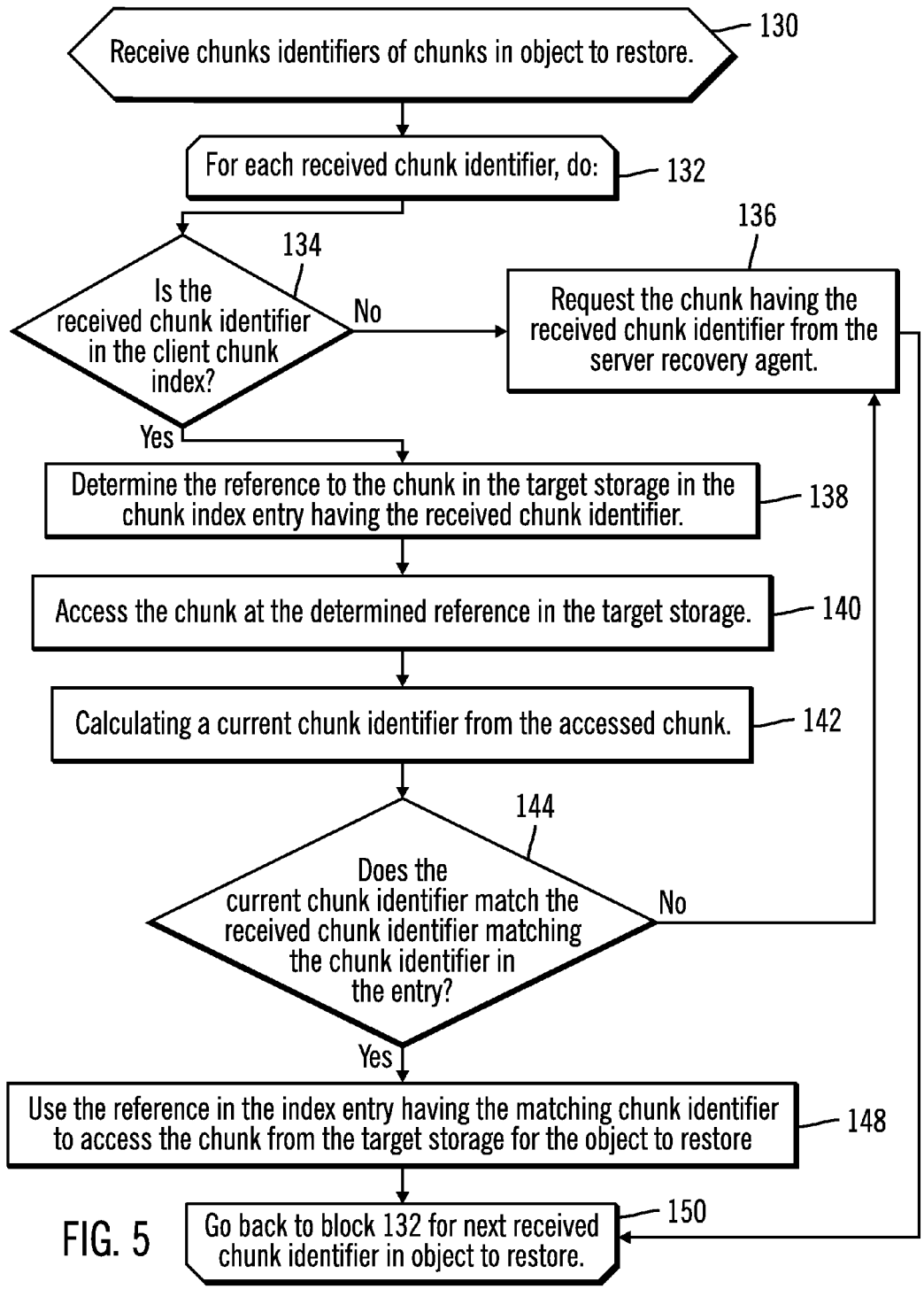
FIG. 5 illustrates an embodiment of operations for a client recovery agent to process chunk identifiers for chunks in an object to restore.

FIG. 5 illustrates an embodiment of operations performed by the client recovery agent 38 to process the chunk identifiers of the object to restore sent by the server recovery agent 20 according to the operations of FIG. 4. The client recovery agent 38 may perform these operations regardless of whether the server 2 implementing the server recovery agent 20 maintains a deduplication index 16 for chunks of data maintained by the server. Upon receiving (at block 130) chunk identifiers, the client recovery agent 38 performs the operations at blocks 132 through 150 for each received chunk identifier in the object to recover. For each received chunk identifier, the client recovery agent 38 determines (at block 134) whether the received chunk identifier is identified in the client chunk index 34, which is determined if there is an entry 70 in the client chunk index 34 having a chunk identifier 72 matching the received chunk identifier. If (at block 134) there is no entry in the client chunk index 34 for the received chunk identifier, then the client recovery agent 38 sends (at block 136) a request to the server recovery agent 20 for the chunk having the received chunk identifier. If (at block 134) there is an entry 70 in the client chunk index 34 for the received chunk identifier, then the client recovery agent 38 determines (at block 138) the reference 74 to the chunk 36 in the target storage 32 in the chunk index entry 70 having the received chunk identifier. The chunk 36 at the determined reference is accessed (at block 140). The client recovery agent 38 may calculate (at block 142) a current chunk identifier from the accessed chunk 36 using the same hash algorithm used to calculate the chunk identifiers. If (at block 144) the current chunk identifier does not match the received chunk identifier matching the chunk identifier in the entry, then control proceeds to block 136 to request the chunk for the received chunk identifier because the referenced chunk in the target storage 32 may not be the most current chunk available, which is maintained at the server storage 10. If (at block 144) the current chunk identifier matches the received chunk identifier, then the client recovery agent 38 uses (at block 148) the reference 74 in the client index entry 70, having the matching chunk identifier 72, to access the chunk 36 from the target storage 32 for the object to restore. In an alternative embodiment, the client recovery agent 38 may just use the referenced chunk 36 in the target storage 32 without recalculating the hash at blocks 142 and 148 to validate the local copy of the chunk.

Figure 6:
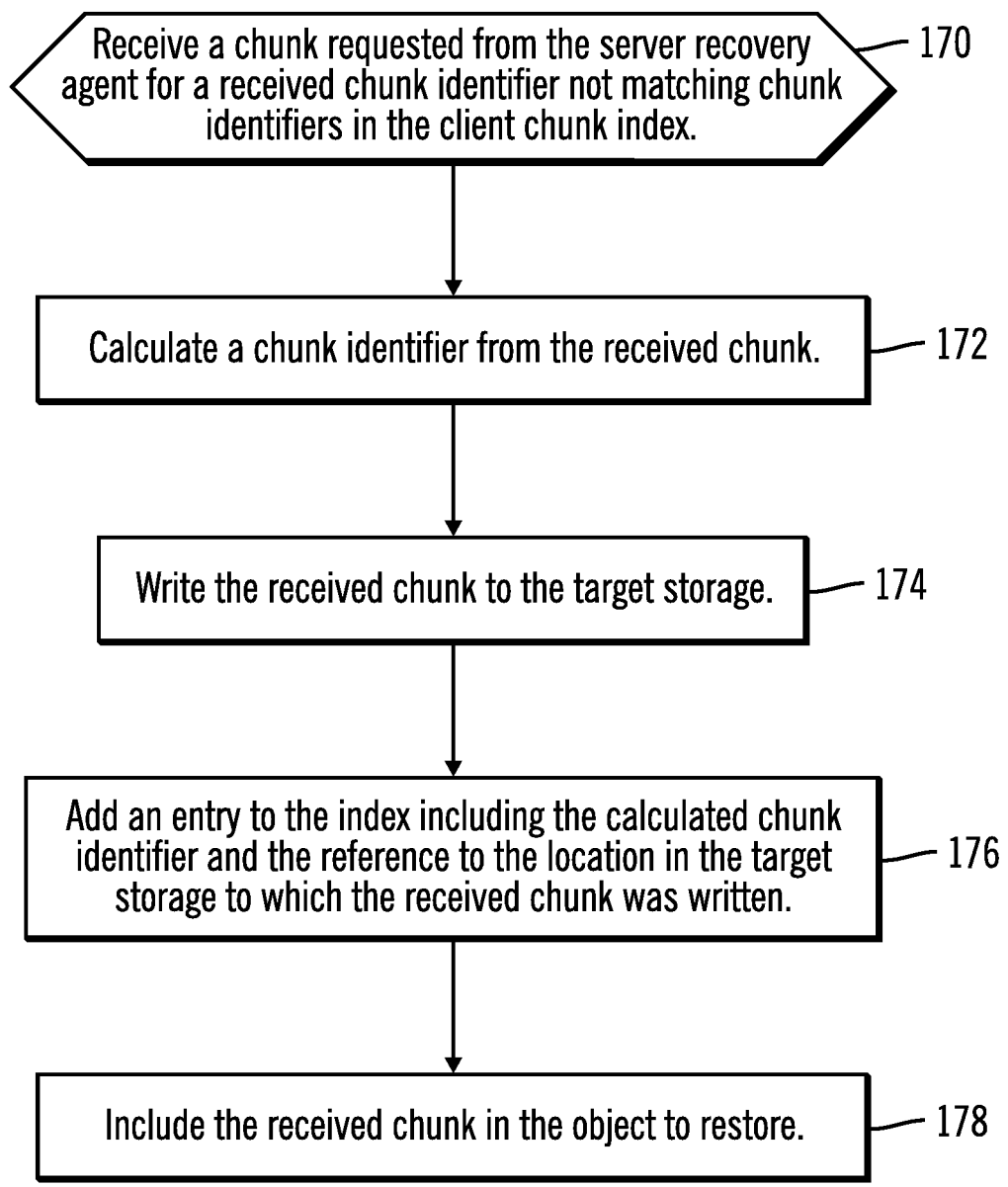
FIG. 6 illustrates an embodiment of operations for the client recovery agent to process chunks received for an object to restore.

FIG. 6 illustrates an embodiment of operations performed by the client recovery agent 38 to process received chunks for objects to recover, which were requested at block 136 in FIG. 5 as part of the object restore operation. Upon receiving (at block 170) a chunk requested from the server recovery agent 20 for a received chunk identifier not matching chunk identifiers in the client chunk index 34, the client recovery agent 38 calculates (at block 172) a chunk identifier from the received chunk and writes (at block 174) the received chunk to the target storage 32. An entry 70 is added (at block 176) to the client chunk index 34 including the calculated chunk identifier 72 and the reference 74 to the location in the target storage 32 to which the received chunk was written. The received chunk is included (at block 178) in the object to restore.

The described embodiments operate in the context of restoring an object from the server storage 10. In additional embodiments, the operations for recovering a data objects may apply to an Input/Output (I/O) request from the client 4 for a data object from the server 2, where the server 2 would initially send the chunk identifiers of the chunks for the requested object so that the client may determine whether the chunks may be accessed locally or need to be retrieved from the server.

With described embodiments, the server recovery agent 20, to conserve network 6 bandwidth, sends the chunk identifiers of the object to recover to the client recovery agent 38. The client recovery agent 38 will first try to obtain the chunk in the object to restore from the target storage 32 using the received chunk identifiers and the client chunk index 34 maintained by the client 4 to manage the chunks 36 in the target storage 32. If the client chunk index 34 indicates that the chunk to restore is not in the target storage 32 or if the chunk in the target storage 32 is not current and validated, then the client recovery agent 38 requests the chunk from the server recovery agent 20. This conserves bandwidth because the server recovery agent 20 only needs to send chunks in the object to restore that are not available at the client. In this way, the client and server recovery agents optimize recovery operations.

Figure 7:
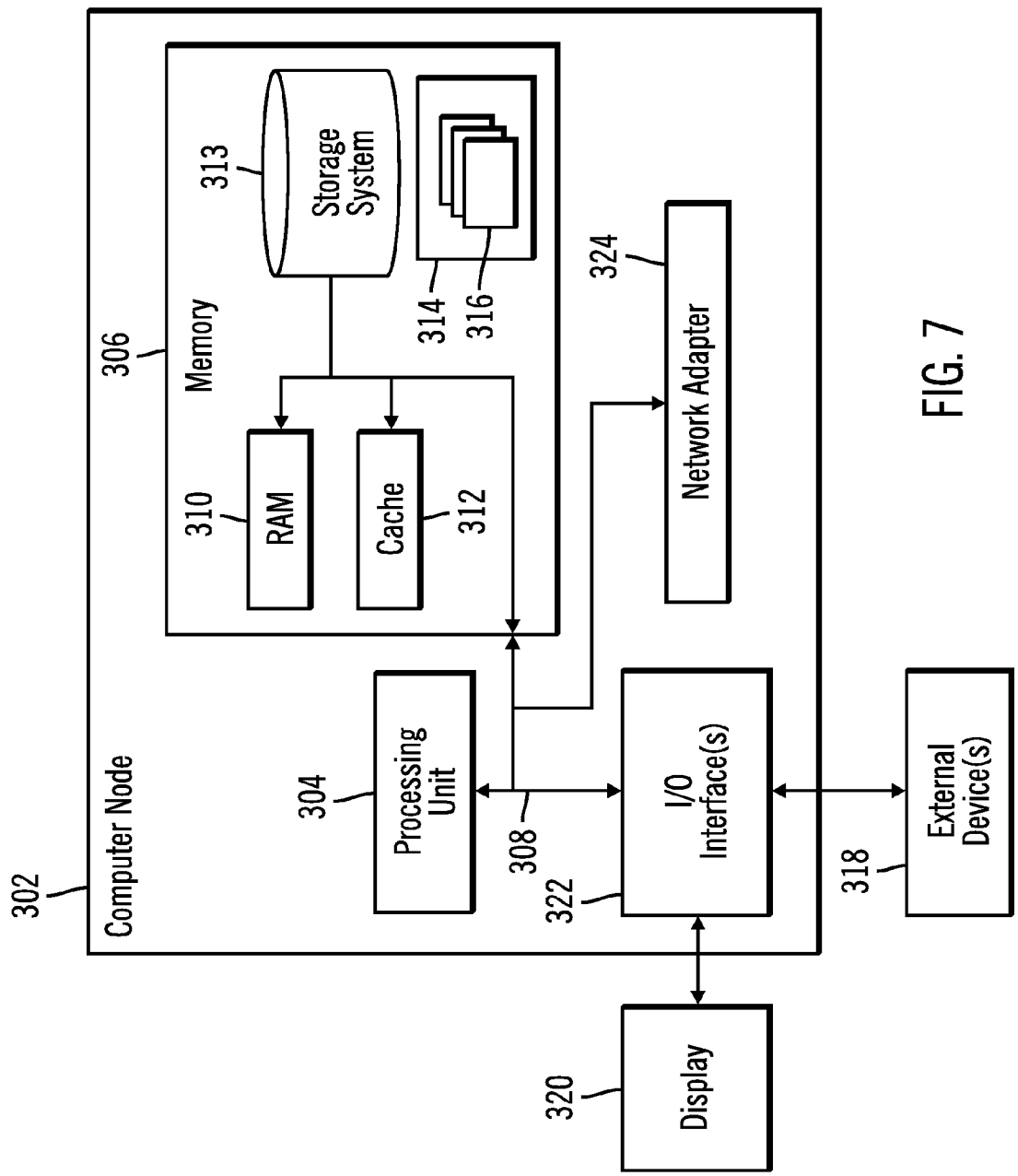
FIG. 7 illustrates an implementation of a computer node in the computing environment.

FIG. 7 illustrates an embodiment of a computer node 302 which may comprise an implementation of the server 2 and client 4 systems. Further, the components of the server 2 and client 4 systems may be implemented in a single node 302 or distributed across more than two nodes 302. The server 2 and client 4 nodes may be implemented in a cloud computing environment in which the server 2 provides storage and deduplication services to the clients 4. Computer node 302 is only one example of a suitable computing node and is not intended to suggest any limitation as to the scope of use or functionality of embodiments of the invention described herein. Regardless, computer node 302 is capable of being implemented and/or performing any of the functionality set forth hereinabove.

The computer node 302 is operational with numerous other general purpose or special purpose computing system environments or configurations. Examples of well-known computing systems, environments, and/or configurations that may be suitable for use with computer node 302 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 302 may be described in the general context of computer system executable instructions, such as program modules, being executed by a computer system. Generally, program modules may include routines, programs, objects, components, logic, data structures, and so on that perform particular tasks or implement particular abstract data types. Computer node 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer node 302 is shown in the form of a general-purpose computing device. The components of computer system/server 302 may include, but are not limited to, one or more processors or processing units 304, a system memory 306, and a bus 308 that couples various system components including system memory 306 to processor 304.

Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 302 typically includes a variety of computer system readable media. Such media may be any available media that is accessible by computer node 302, and it includes both volatile and non-volatile media, removable and non-removable media, and may be used for storing the object information 30, 14, indexes 18, 34, recovery agent programs 20, 38, and storage manager 12.

System memory 306 can include computer system readable media in the form of volatile memory, such as random access memory (RAM) 310 and/or cache memory 312. Computer node 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. Program modules 316 generally carry out the functions and/or methodologies of embodiments of the invention as described herein, such as the operations of the storage manager 12.

Computer node 302 may also communicate with one or more external devices 318 such as a keyboard, a pointing device, a display 320, etc.; one or more devices that enable a user to interact with the computer node 302; and/or any devices (e.g., network card, modem, etc.) that enable computer system/server 302 to communicate with one or more other computing devices. Such communication can occur via Input/Output (I/O) interfaces 322. Still yet, computer node 302 can communicate with one or more networks such as a local area network (LAN), a general wide area network (WAN), and/or a public network (e.g., the Internet) via network adapter 324. As depicted, network adapter 324 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, a semiconductor system, apparatus, or device, or any suitable combination thereof utilizing one or more suitable storage technologies, such as electronic, magnetic, optical, electromagnetic, infrared. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The variable "n" is used to represent a variable positive integer number of an element, such as variable number of chunk identifiers in object information, variable number of merge levels, etc. These variables associated with different elements may comprise a same or different integer value.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the Figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for communicating with a server recovery agent to recover objects in a server storage and communicate with a client storage, comprising a non-transitory computer readable storage medium having computer readable program code embodied therein to execute to perform operations, the operations comprising:

generating unique client chunk identifiers calculated by processing chunks of data in data objects stored in the client storage, wherein each of the client chunk identifiers identifies one of the chunks of data in the client storage;

adding an entry to a client chunk index for each generated client chunk identifier, wherein each client chunk index entry includes one of the client chunk identifiers and a reference to a chunk of data in the client storage from which the client chunk identifier was calculated;

transmitting to a server recovery agent a request to recover an object;

receiving, from the server recovery agent, server chunk identifiers of chunks of data in the object at the server storage to recover;

determining from the client chunk index whether the received server chunk identifiers of chunks of data in the object to recover match the client chunk identifiers indicated in the client chunk index;

requesting the chunks of data in the object from the server recovery agent for the received server chunk identifiers not matching the client chunk identifiers in the client chunk index;

calculating a current client chunk identifier from a copy of a chunk of data in the client storage identified by the client chunk identifier matching one of the received server chunk identifiers; and requesting, from the server recovery agent, each of at least one of the chunks of data in the object at the server storage for each of the received server chunk identifiers not matching the current client chunk identifier calculated for the chunk of data identified by the client chunk identifier matching the server chunk identifier; and in response to one of the received server chunk identifiers matching the client chunk identifiers in the client chunk index, using the reference in the client chunk index entry having the matching client chunk identifier to access the chunk of data from the client storage.

2. The computer program product of claim 1, wherein the server recovery agent is implemented in a server having not performed deduplication for the chunks of data maintained in the server storage.

3. The computer program product of claim 1,
wherein the calculating the current client chunk identifier for each of the received server chunk identifiers matching the client chunk identifiers in the client chunk index comprises:
using the reference in the client chunk index entry having the matching client chunk identifier to access the chunk of data from the client storage; and
calculating the current client chunk identifier from the accessed chunk,
wherein the operations further comprise determining whether the current client chunk identifier matches the received server chunk identifier matching the client chunk identifier in the client chunk index entry, wherein the requesting each of at least one of the chunks of data from the server recovery agent is performed in response to determining the current client chunk identifier does not match the received server chunk identifier.

4. The computer program product of claim 3, wherein the operations further comprise:
using the accessed chunk in the object to restore in response to determining the current client chunk identifier matches one of the received server chunk identifiers.

5. The computer program product of claim 1, wherein the operations further comprise:
receiving each chunk of data requested from the server recovery agent for each of the received server chunk identifiers not matching the client chunk identifiers in the client chunk index;
calculating a client chunk identifier from the received chunk from the server recovery agent;
writing the received chunk to a location in the client storage; and adding an entry to the client chunk index including the calculated client chunk identifier and the reference to the location in the client storage where the received chunk was written.

6. The computer program product of claim 1, wherein the server storage is coupled to a backup storage server and wherein the server recovery agent comprises a component configured to interact with the backup storage server backing up objects to handle recovery requests.

7. A computer program product for processing requests for data objects stored in a server storage from a client recovery agent, comprising a non-transitory computer readable storage medium having computer readable program code embodied therein to execute to perform operations, the operations comprising:
maintaining a server chunk index of server chunk identifiers calculated from chunks of data stored in the storage server, wherein each server chunk index entry includes one of the server chunk identifiers and a reference to the chunk of data in the storage server used to calculate the server chunk identifier;
receiving a first request from the client recovery agent to recover an object from the server storage;
determining server chunk identifiers of chunks of data in the object to recover;
determining whether the server chunk index includes server chunk identifiers in entries for chunks of data in the object to recover;
calculating server chunk identifiers for the chunks of data in the object to recover not having an entry in the server chunk index;
sending the determined server chunk identifiers to the client recovery agent to use to recover the object;
receiving a second request from the client recovery agent for each of the chunks of data associated with one of the determined server chunk identifiers not matching a client chunk identifier for the chunk of data in a client chunk index the client recovery agent maintains for chunks of data in a client storage;
receiving the second request from the client recovery agent for each of the chunks of data associated with one of the determined server chunk identifiers matching a calculated current client chunk identifier, calculated by the client recovery agent from the chunk of data stored in the client storage in response to the client chunk identifier matching the server chunk identifier; and
transmitting each of the chunks of data requested in the second request to the client recovery agent.

8. The computer program product of claim 7, wherein a deduplication index is not maintained for the chunks of data in the server storage.

9. A system for communicating with a client storage and a server recovery agent to recover objects from a server storage, comprising:
a processor; and
a computer readable storage medium having computer readable program code embodied executed by the processor to perform operations, the operations comprising:
generating unique client chunk identifiers calculated by processing chunks of data in data objects stored in the client storage, wherein each of the client chunk identifiers identifies one of the chunks of data in the client storage;
adding an entry to a client chunk index for each generated client chunk identifier, wherein each client chunk index entry includes one of the client chunk identifiers and a reference to the chunk of data in the client storage from which the client chunk identifier was calculated;

transmitting to a server recovery agent a request to recover an object;

receiving, from the server recovery agent, server chunk identifiers of chunks of data in the object to recover;

determining from the client chunk index whether the received server chunk identifiers of chunks of data in the object to recover match the client chunk identifiers indicated in the client chunk index;

requesting the chunks of data in the object from the server recovery agent for the received server chunk identifiers not matching the client chunk identifiers in the client chunk index;

calculating a current client chunk identifier from a copy of a chunk of data in the client storage identified by the client chunk identifier matching one of the received server chunk identifiers matches the client chunk identifier for the chunk of data in the client chunk index; and requesting, from the server recovery agent, each of at least one of the chunks of data in the object at the server storage for each of the received server chunk identifiers not matching the current client chunk identifier calculated for the chunk of data identified by the client chunk identifier matching one of the server chunk identifiers; and in response to one of the received server chunk identifiers matching the client chunk identifiers in the client chunk index, using the reference in the client chunk index entry having the matching client chunk identifier to access the chunk of data from the client storage.

10. The system of claim 9, wherein the server recovery agent is implemented in a server not having performed deduplication for the chunks of data maintained in the server storage.

11. The system of claim 9,
wherein the calculating the current client chunk identifier for each of the received server chunk identifiers matching the client chunk identifiers in the client chunk index comprises:
using the reference in the client chunk index entry having the matching client chunk identifier to access the chunk of data from the client storage; and
calculating a current client chunk identifier from the accessed chunk,
wherein the operations further comprise determining whether the current client chunk identifier matches the received server chunk identifier matching the client chunk identifier in the client chunk index entry, wherein the requesting each of at least one of the chunks of data from the server recovery agent is performed in response to determining the current client chunk identifier does not match one of the received server chunk identifiers.

12. The system of claim 11, wherein the operations further comprise:
using the accessed chunk in the object to restore in response to determining the current client chunk identifier matches one of the received server chunk identifiers.

13. The system of claim 9, wherein the server storage comprises a backup storage server and wherein the server recovery agent comprises a component configured to interact with the backup storage server backing up objects to handle recovery requests.

14. A system for processing requests for data objects stored in a server storage from a client recovery agent, comprising:
a processor; and
a computer readable storage medium having computer readable program code executed by the processor to perform operations, the operations comprising:
maintaining a server chunk index of server chunk identifiers calculated from chunks of data stored in the storage server, wherein each server chunk index entry includes one of the server chunk identifiers and a reference to the chunk of data in the storage server used to calculate the server chunk identifier;
receiving a first request from the client recovery agent to recover an object from the storage server;
determining server chunk identifiers of chunks of data in the object to recover;
determining whether the server chunk index includes server chunk identifiers in entries for chunks of data in the object to recover;
calculating server chunk identifiers for the chunks of data in the object to recover not having an entry in the server chunk index;
sending the determined server chunk identifiers to the client recovery agent to use to recover the object;
receiving a second request from the client recovery agent for each of the chunks of data associated with the determined server chunk identifiers in response to the determined server chunk identifier for the chunk not matching a client chunk identifier for the chunk of data in a client chunk index the client recovery agent maintains for chunks of data in a client storage;
receiving the second request from the client recovery agent for each of the chunks of data associated with one of the determined server chunk identifiers matching a calculated current client chunk identifier, calculated by the client recovery agent from the chunk of data stored in the client storage in response to the client chunk identifier matching the server chunk identifier; and
transmitting each of the chunks of data requested in the second request to the client recovery agent.

15. A method for communicating with a server recovery agent to recover data objects from a server storage, comprising:
generating, by a processor, unique client chunk identifiers calculated by processing chunks of data in the data objects stored in a client storage, wherein each of the client chunk identifiers identifies one of the chunks of data in the client storage;
adding, by the processor, an entry to a client chunk index for each generated client chunk identifier, wherein each client chunk index entry includes one of the client chunk identifiers and a reference to the chunk of data in the client storage from which the client chunk identifier was calculated;
transmitting, by the processor, to a server recovery agent a request to recover an object;
receiving, by the processor, from the server recovery agent, server chunk identifiers of chunks of data in the object at the server storage to recover;
determining, by the processor, from the client chunk index whether the received server chunk identifiers of chunks of data in the object to recover match the client chunk identifiers indicated in the client chunk index;

requesting, by the processor, the chunks of data in the object from the server recovery agent for the received server chunk identifiers not matching the client chunk identifiers in the client chunk index;

calculating a current client chunk identifier from a copy of a chunk of data in the client storage identified by the client chunk identifier matching one of the received server chunk identifiers;

requesting, by the processor, from the server recovery agent, each of at least one of the chunks of data in the object at the server storage for each of the received server chunk identifiers not matching the current client chunk identifier calculated for the chunk of data identified by the client chunk identifier matching the server chunk identifier for; and in response to one of the received server chunk identifiers matching the client chunk identifiers in the client chunk index, using the reference in the client chunk index entry having the matching client chunk identifier to access the chunk of data from the client storage.

16. The method of claim 15, wherein the server recovery agent is implemented in a server not having performed deduplication for the chunks of data maintained in the server storage.

17. The method of claim 15, wherein the calculating the current client chunk identifier for each of the received server chunk identifiers matching the client chunk identifiers in the client chunk index comprises:

using the reference in the client chunk index entry having the matching client chunk identifier to access the chunk of data from the client storage; and calculating the current client chunk identifier from the accessed chunk, further comprising determining whether the current client chunk identifier matches the received server chunk identifier matching the client chunk identifier in the client chunk index entry, wherein the requesting each of at least one of the chunks of data from the server recovery agent is performed in response to determining the current client chunk identifier does not match the received server chunk identifier.

18. The method of claim 17, further comprising:

using the accessed chunk in the object to restore in response to determining the current client chunk identifier matches the received server chunk identifier.

19. The method of claim 15, wherein the storage server comprises a backup storage server and wherein the server recovery agent comprises a component configured to interact with the backup storage server backing up objects to handle recovery requests.

20. A method for processing requests for data objects stored in a server storage from a client recovery agent, comprising:

maintaining a server chunk index of server chunk identifiers calculated from chunks of data stored in the storage server, wherein each server chunk index entry includes one of the server chunk identifiers and a reference to one of the chunks of data in the storage server used to calculate the server chunk identifier;

receiving, by a processor, a first request from the client recovery agent to recover an object from the storage server;

determining, by the processor, server chunk identifiers of chunks of data in the object to recover;

determining whether the server chunk index includes server chunk identifiers in entries for chunks of data in the object to recover;

calculating server chunk identifiers for the chunks of data in the object to recover not having an entry in the server chunk index;

sending, by the processor, the determined server chunk identifiers to the client recovery agent to use to recover the object;

receiving, by the processor, a second request from the client recovery agent for each of the chunks of data associated with the determined server chunk identifiers in response to the determined server chunk identifier for the chunk of data not matching a client chunk identifier for the chunk in a client chunk index the client recovery agent maintains for chunks of data in a client storage;

receiving the second request from the client recovery agent for each of the chunks of data associated with one of the determined server chunk identifiers matching a calculated current client chunk identifier, calculated by the client recovery agent from the chunk of data stored in the client storage in response to the client chunk identifier matching the server chunk identifier; and transmitting, by the processor, each of the chunks of data requested in the second request to the client recovery agent.

* * * * *